United States Patent [19]

Gupta et al.

[11] Patent Number: 4,487,644

[45] Date of Patent: Dec. 11, 1984

[54] BINDERLESS WELD-BONDING OF PRESHAPED SIC-BASE PARTS INTO SOLID BODIES

[75] Inventors: Ashok K. Gupta; Ernoe Gyarmati, both of Jülich; Hermann Kreutz, Monchen-Gladbach; Rudolf Muenzer, Alsdorf; Aristides Naoumidis, Jülich, all of Fed. Rep. of Germany

[73] Assignee: Kernforschungsanlage Julich GmbH, Julich, Fed. Rep. of Germany

[21] Appl. No.: 423,458

[22] Filed: Sep. 24, 1982

[30] Foreign Application Priority Data

Oct. 2, 1981 [DE] Fed. Rep. of Germany ....... 3139270

[51] Int. Cl.³ ............................................ C03B 29/00
[52] U.S. Cl. ......................................... 156/89; 264/56
[58] Field of Search ...................... 156/89; 416/241 B; 264/56

[56] References Cited

U.S. PATENT DOCUMENTS 2,319,323  5/1943  Heyroth .
3,239,323  3/1966  Folweiler ............................. 156/89
4,156,051  5/1979  Nakamura et al. ................... 156/89

FOREIGN PATENT DOCUMENTS 1077132  3/1960  Fed. Rep. of Germany .
2439930  3/1975  Fed. Rep. of Germany .
2922953  12/1979  Fed. Rep. of Germany .
1796279  5/1980  Fed. Rep. of Germany .
3037199  4/1982  Fed. Rep. of Germany .

*Primary Examiner*—Jay H. Woo
*Assistant Examiner*—Timothy W. Heitbrink
*Attorney, Agent, or Firm*—Frishauf, Holtz, Goodman & Woodward

[57] ABSTRACT

Component bodies of silicon carbide base material, at least in their surface layers, are welded together without the provision of a binder at finely polished joining surfaces by virtue of the fact that at least one of the joint surfaces is of a silicon carbide material containing an excess of silicon (SiSiC). The component bodies are kept closely fitted together especially by an additional pressing force of at least 0.1 kg/cm² during a heating stage at atmospheric or lower pressure at a temperature in the range from 1500° C. to 1800° C. for 15 to 100 minutes in an inert atmosphere, the excess of silicon at the boundary making it possible for silicon carbide crystal growth to take place across the boundary.

6 Claims, 1 Drawing Figure

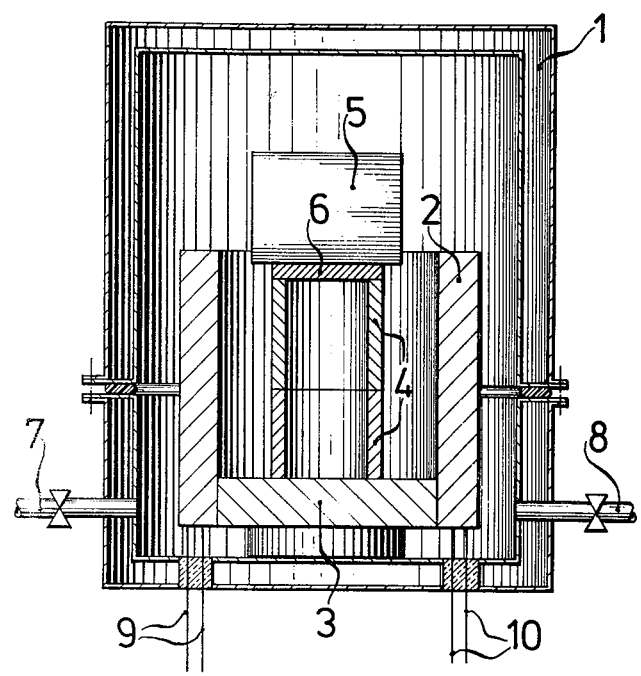

BINDERLESS WELD-BONDING OF PRESHAPED SIC-BASE PARTS INTO SOLID BODIES

This invention concerns a process of making bodies of silicon carbide base mterial to a complex shape by high-termperature bonding of parts previously made so as to fit closely together.

BACKGROUND OF PRIOR ART

The production of silicon carbide bodies from carbon body components by siliconizing, accompanied by simultaneous "growing together" of the component bodies, is disclosed in German Published Patent Application DE-OS No. 30 37 199. The bonding together of bodies coated with silicon carbide or of bodies consisting entirely of silicon carbide, either to each other or to carbon bodies, by the interposition of a carbon-containing binder and the infiltration of melted silicon is known from German Patent Document DE-AS No. 17 96 279 and U.S. Pat. No. 2, 319,323.

SUMMARY OF THE INVENTION

It is an object of the present invention to provide a method of firmly combining together shaped parts of silicon carbide base material without the necessity of using a carbonaceous binder and without the necessity of treating with molten silicon, in order to obtain a firmly bonded and substantially integral body manufacturable to closer dimensions than heretofore.

The present invention has unexpectedly discovered that silicon carbide bodies or bodies having a silicon carbide surface of separate and even different kinds of manufacture to shapes permitting close fitting together can be bonded together without the interposition of a binder or cement and without silicon infiltration from the exterior of the aggregate, if mobile silicon in the form of SiSiC is present at the bonding surface.

The designation SiSiC as a material is known in the art and designates a silicon carbide body containing silicon in excess of the stoichiometric silicon carbide ratio. Bodies of such material or bodies having surface layers of such material can be made directly by siliconizing a carbon body or a body of carbon-containing material. The siliconizing can be carried out to affect the body through and through, or only in a surface layer, in the latter case resulting in a body having a surface layer of SiSiC. The making of such bodies by siliconizing, for example immersing them in molten silicon, is known in the art.

For use in the present invention, melt-silicized bodies, either siliconized through and through, or silicized only enough to provide SiSiC boundary surfaces, are preferred. The silicon excess is preferably about 15% by weight and may conveniently be between 8 and 20%. Such an excess of silicon should extend at least to a depth of about 10 $\mu$m.

The process of the invention, briefly stated, comprises the steps of making body parts either of silicon carbide entirely or having boundary layers of silicon carbide and in any case having the boundary surfaces (meaning the surfaces which are to be bonded together) finely polished, at least one of the two boundary layers to be fitted together being of SiSiC material; the bodies are fitted together closely without binder or cement and are thus heated in an inert atmosphere at a pressure between $10^{3 1\, 3}$ torr. and 1 atmosphere, and preferably in the neighborhood of $10^{-2}$ torr., at a temperature between 1500° C. and 1800° C., preferably in the neighborhood of 1600° C. for a period of 15 to 100 minutes.

In this process, as already mentioned, at least one of the bodies to be bonded together across a boundary surface to another body must contain excess silicon at least at or very near its surface. It is believed that the excess silicon, or some of it, melts during the heat treatment, and because of the solubility of SiC in molten silicon, makes possible an interlocking SiC crystal growth across the boundary surfaces, so that an effective union of the body parts is obtained.

The bonding surfaces must be highly polished, as can be done by grinding and polishing with diamond paste (grain size for the final polishing stages about 1 $\mu$m).

The heating of the fitted-together bodies takes place in oxgyen-free inert atmosphere at a pressure in the above-designated range, preferably at about $10^{-2}$ torr. The finely polished surfaces are preferably pressed together and of course the quality of polishing and the size of the contact surfaces is of great importance for obtaining growth of silicon carbide crystallites extending across the boundary surface. Preferably the bonding surface should be loaded with a force of at least 0.1 kg/cm$^2$, preferably with 1 to 10 kg/cm$^2$, a force in the neighborhood of 5 kg/cm$^2$ being most preferred.

THE DRAWING

The invention is further described by way of illustrative example with reference to the annexed drawing, the single FIGURE of which represents, in schematic cross-section, an apparatus suitable for bonding together pieces of tubing by the method of the invention.

DESCRIPTION OF EXAMPLES

The apparatus shown in the drawing comprises a double-walled container 1 capable of being evacuated, equipped with a cylindrical heating element 2 and providing a support surface 3 for samples 4, which are shown loaded with a weight 5 of molybdenum or tungsten, with the interposition of graphite or carbon felt 6. Pipe connections 7 and 8 are for flushing the container 1 with inert gas and also for evacuation. The heating element has leads 9 and 10 provided with feedthrough insulation for passage through the container walls.

EXAMPLE 1

Two tubing pieces of a wall thickness of 5 mm and a density of 3.00 g/cm$^3$ made of SiSiC by dip-siliconizing of carbon bodies were bonded together end to end in the apparatus shown in the drawing. The end surfaces were first dressed with a cutting wheel and then polished on a diamond grinding wheel of a 90 $\mu$m grain size fo 15 minutes at 500 rpm. Thereafter, these end surfaces were polished at 250 rpm with diamond paste for 15 minutes with a 45 $\mu$m grain size paste and for 15 minutes with a 15 $\mu$m grain size paste. Finally the surfaces were finely polished in two 10-minute steps respectively with 3 $\mu$m and 1 $\mu$m grain size paste.

The polished end surfaces were put together in compression by a pressure of 1 kg/cm$^2$ (0.1 megapascal) and were thus heated in the container in an oxygen-free atmosphere at a reduced pressure of $10^{-2}$ torr. for 30 minutes at 1600° C.

Metallographic sections, suitably polished, of the cooled samples showed at the joint a thorough bond with SiC crystals reaching across the boundary surfaces. The resistance to bending of the products obtained was in the neighborhood of 300 MPa.

EXAMPLE 2

Two 1 cm$^2$ surfaces, respectively of SiSiC and hot-pressed SiC, were polished in the same manner as the tube ends in Example 1 and then were heated up in the illustrated apparatus in an oxygen-free atmosphere at a pressure of 10$^{-2}$ torr. for 60 minutes at 1800° C., while the bonding surfaces were loaded with a pressure of 1 kg/cm$^2$. Metallographic investigation of the cooled sample showed an uninterrupted and unobstructed bond of the parts and the bending strength of the product obtained at the weld was 250 MPa.

Although the process of the invention has been described with reference to particular illustrative examples, it will be understood that variations and modifications are possible within the inventive concept.

We claim:

1. Method of producing complex shaped bodies on a silicon carbide basis comprising the steps of:

prefabricating integral component bodies with polished boundary surfaces for fitting together with each other and thereby forming boundary surfaces, said component bodies having their boundary surfaces composed of a material selected from the group of SiC and SiSiC, said composition being the same for at least a layer of the body adjoining the boundary surface, at least one component body of every pair of component bodies facing each other across a said boundary surface having a surface and at least a surface layer thereunder composed of SiSiC having excess silicon, with reference to the stoichiometric SiC composition, of at least 8% by weight, to a depth of about 10 μm, adjoining said boundary surface;

fitting said components closely together without the interposition of a binder and without application of pressure in excess of 10 kg/cm$^2$, and heating the fitted-together bodies in an inert atmosphere at a pressure between 10$^{-3}$ torr and 1 atmosphere at a temperature between 1500° C. and 1800° C. for not less than 15 minutes and not more than 100 minutes, followed by cooling.

2. Method as defined in claim 1, in which the pressure at which the heating step is performed is in the neighborhood of 10$^{-2}$ torr.

3. Method as defined in claim 1, in which the temperature of said heating step is maintained in the neighborhood of 1600° C.

4. Method as defined in claim 1, in which the step of fitting said component bodies together includes applying a pressure of at least 0.1 kg/cm$^2$ across each of the boundary surfaces where the component bodies are to be bonded together, and in which said pressure is maintained during the heat step.

5. Method as defined in claim 4, in which said pressure applied across said boundary surfaces and maintained during the heating step is in the range from 1 to 10 kg/cm$^2$.

6. Method as defined in claim 5, in which said pressure applied across said boundary surfaces and maintained during the heating step is in the neighborhood of 5 kg/cm$^2$.

* * * * *